United States Patent [19]

Sata et al.

[11] 4,063,414

[45] Dec. 20, 1977

[54] METHOD AND APPARATUS FOR PRODUCING HIGH ENERGY GASEOUS FLUID SUBSTANTIALLY NOT CONTAINING PHYSIOLOGICALLY HARMFUL SUBSTANCES

[76] Inventors: Naoyasu Sata, No. 80, Yamate-cho, Ashiya, Hyogo; Kensaku Imaichi, No. 31-50-405, Gotenyama-cho, 2-chome, Takarazuka, Hyogo; Tatsuzo Hirose, No. 9-18, Fukatani-cho, Nishinomiya, Hyogo, all of Japan

[21] Appl. No.: 673,690

[22] Filed: Apr. 5, 1976

[30] Foreign Application Priority Data

Oct. 15, 1975 Japan .................. 50-123261

[51] Int. Cl.² ........................... F02C 7/00
[52] U.S. Cl. ................. 60/39.05; 60/39.55; 126/359
[58] Field of Search ........... 60/39.05, 39.46 R, 39.55, 60/39.53, 39.56, 39.57, 39.58; 123/1 A; 126/359

[56] References Cited

U.S. PATENT DOCUMENTS

| | | | |
|---|---|---|---|
| 2,168,313 | 8/1939 | Bichowsky | 60/39.55 |
| 2,359,108 | 9/1944 | Hoskins | 60/39.58 |
| 2,697,032 | 12/1954 | Jones | 60/39.55 |
| 2,916,877 | 12/1959 | Walter | 60/39.55 |
| 3,101,592 | 8/1963 | Robertson et al. | 60/39.05 |
| 3,134,228 | 5/1964 | Wolansky et al. | 60/39.46 R |
| 3,449,908 | 6/1969 | Aquet | 126/359 |
| 3,708,976 | 1/1973 | Berlyn | 60/39.05 |
| 3,817,232 | 6/1974 | Nakajima et al. | 123/1 A |

FOREIGN PATENT DOCUMENTS 279,197   10/1927   United Kingdom ............... 60/39.55

*Primary Examiner*—Carlton R. Croyle
*Assistant Examiner*—L. J. Casaregola
*Attorney, Agent, or Firm*—Blanchard, Flynn, Thiel, Boutell & Tanis

[57] ABSTRACT

A method and apparatus for producing a high energy fluid of high temperature and pressure substantially not containing physiologically harmful substances, such as nitrogen oxides $NO_x$ and carbon monoxide CO, by combusting a fluid-type or a fine powder-type fuel.

Volume-controlled fuel is introduced together with volume-controlled pure oxygen through a nozzle into a closed pressure-tight container from its bottom and the mixture thereof is ignited therein for substantially complete combustion to provide an up-going jet flame of high temperature. Volume-controlled stream of de-aired water is forced into this container from its top toward the flame for heat exchange with the heat from the jet flame to produce steam of high temperature and pressure and to simultaneously lower the temperature of the combustion gas. The high energy gaseous fluid of high temperature and pressure which is a mixture consisting of the combustion gas of the fuel-oxygen and the steam is jetted to the outside of the system via a pressure-control valve provided locally through the container, to be used as the motive power of a heat engine.

16 Claims, 1 Drawing Figure

U.S. Patent      Dec. 20, 1977      4,063,414
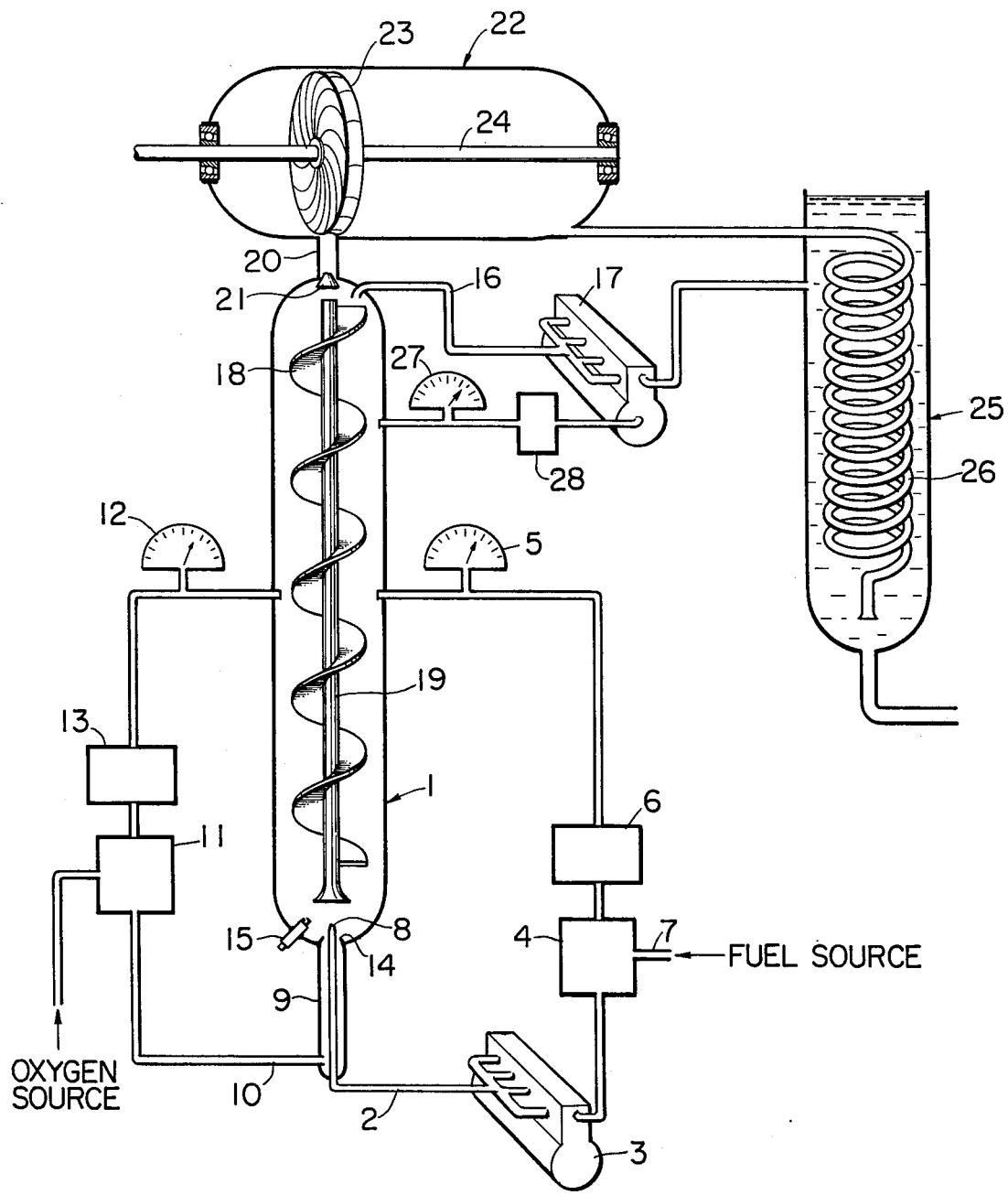

METHOD AND APPARATUS FOR PRODUCING HIGH ENERGY GASEOUS FLUID SUBSTANTIALLY NOT CONTAINING PHYSIOLOGICALLY HARMFUL SUBSTANCES

BACKGROUND OF THE INVENTION a. Field of the Invention

The present invention relates generally to a motive power system such as a gas turbine system, and more particularly it pertains to a method and an apparatus for producing a high energy gaseous fluid of high temperature and pressure which can be used as the actuator fluid of a heat engine such as a gas turbine system. Still more particularly, the present invention concerns a method and an apparatus for producing a high energy gaseous fluid substantially free of physiologically harmful substances (nitrogen oxides $No_x$, carbon monoxide CO and hydrocarbon HC) by substantially completely combusting, in an oxygen stream, a fuel of fluid-type or fine powder-type, and along therewith by forcing, into a closed pressure-tight container intended for performing said combustion, liquidous water for substantial direct heat exchange with the heat of the combustion gas to produce steam of high temperature, high pressure and high energy.

b. Brief description of the Prior Art

In general, it has been known, in for example steam engines and steam turbine systems, to utilize steam of high temperature and high pressure as the actuator fluid for use as an industrial motive power source. Steam of high temperature and high pressure is produced usually by a steam boiler. A gas turbine system, on the other hand, is arranged to be operative so that a fluid fuel which is ejected under pressure from a nozzle is combusted under the state of being mixed with a pressurized air, and the gas mixture is ignited and combusted. The resulting high temperature, high pressure combustion gas (whose components contain, in addition to the carbon dioxide and the steam which are generated from the combustion of the fuel, since the combustion utilizes air as the oxygen source, large amounts of nitrogen $N_2$ and nitrogen oxides $NO_x$ which is extremely harmful physiologically even when its amount is small) is blown under a high pressure onto the blades of a turbine, to convert the energy of such combustion gas into mechanical energy. In each of these prior motive power generating techniques, air is used as the oxygen source which is necessary for the combustion of the fuel as the source of heat. Almost all the industrial energy sources are obtained from combustion of a fuel which is performed in the air. The problem which is attracting the attention of the people throughout the world is the counter-measure of the air pollution caused by the combustion of fuel. When various types of fuels are combusted by the use of oxygen, the combustion gases which are exhausted from the chimneys of industrial plants, the exhaust pipes of automobiles, etc. contain, in addition to the carbon dioxide and steam which are produced from the combustion of the fuels, carbon monoxide, uncombusted fuels (mainly hydrocarbons) which are due to incomplete combustion, a large amount of nitrogen which is an inert gas and which occupies substantially 80% of air, and a small amount of nitrogen oxides ($NO_x$). These components of the exhausted gases are called "the worst three pollution substances". The former two, i.e. carbon monoxide and hydrocarbon are large in amount. However, after various research, there have been established substantially practical counter-measures for the cleaning of these two substances. As for the control and removal of $NO_x$ which is produced in a relatively small amount but is deadly toxin, there has not yet been achieved a practical means to carry out its control and removal.

The nitrogen oxides $NO_x$ are the by-products in the exhaust gases. These nitrogen oxides are inevitably produced by the use of air which contains nitrogen in an amount about 80% of air and oxygen which is indispensable for the combustion of fuels. Accordingly, in order to eliminate $NO_x$ drastically, one can not rely on anything else but on shutting out the intervention of $N_2$. As a means for materializing this shutting-out, it is proposed not to use air as the oxygen source necessary for combustion, but to use pure oxygen instead. By doing so, the formation of $NO_x$ can be prevented completely.

However, when a fuel is combusted in a stream of oxygen, there is obtained perfect combustion. Therefore, there will be produced a high temperature extending as high a 2000° C. When, for example, acetylene is combusted alike in a gas burner intended for welding, in which acetylene is combusted in a stream of oxygen, the jet flame having a bluish white color which is produced will have a high temperature exceeding 2000° C. Such a high temperature flame cannot be utilized either in an ordinary steam boiler or in a gas turbine system. The jet flame is of a directional orientation and has a small flame area (high temperature area). Accordingly, if such a burner as stated above is installed in the combustion chamber of an ordinary steam boiler, the water pipe which is to be heated is not heated throughout the entire parts or length of the pipe. Not only that, but there is the fear that the wall of the water pipe located close to the foremost end of the jet flame will be melted and broken very soon as the wall is contacted by the end of the flame. This applies in the same way to a gas turbine system. Even if some counter-measure for the above-said local limited heating by the flame is taken, it should be understood that if the burner is used in an air atmosphere as in a currently used ordinary combustion engine, there is produced a large amount of $NO_x$ due to the oxidization of nitrogen contained in the intake air which is caused by a high temperature.

SUMMARY OF THE INVENTION

It is, therefore, an object of the present invention is to provide a method and an apparatus for producing a gaseous fluid of high temperature, high pressure and high energy, containing therein no physiolocially harmful nitrogen oxides.

Another object of the present invention is to provide a method and an apparatus for producing said high energy gaseous fluid having such temperature and pressure as can be used as an acutuator fluid for a heat engine such as a gas turbine system or the like.

Still another object of the present invention is to provide a method and an apparatus for producing said high energy gaseous fluid at a very high thermal efficiency by performing substantially complete combustion of either a fluid-type fuel or a solid-type fuel of fine powder form.

These and other objects as well as the advantages of the present invention will become apparent by reading the following detailed description of the present invention when taken in conjunction with the accompanying drawing.

BRIEF DESCRIPTION OF THE DRAWING

The drawing is a diagrammatic arrangement of a motive power system employing an embodiment of the present invention.

DETAILED DESCRIPTION OF THE PREFERRED EMBODIMENT

According to the method of the present invention, a fluid-type or fine powder-type fuel, together with pure oxygen, is introduced into a closed, pressure-tight container which is insulated from ambient atmosphere; the fuel thus introduced into the container is ignited in a pure oxygen atmosphere and is substantially combusted, to produce combustion gas as high as 2000° C in temperature. This combustion is conducted not in air which contains about 80% of nitrogen $N_2$, but in a pure oxygen atmosphere. Accordingly, the combustion gas consists of only steam and carbon dioxide $CO_2$ which are the products of the complete combustion of a hydrocarbon fuel (such as heavy oil, petroleum or coal), and does not contain any nitrogen oxide $NO_x$.

According to the method of the present invention, there is introduced — into said closed, pressure-tight container — air-free water. This water performs heat exchange with the heat of the high temperature combustion gas to produce steam of high temperature and high pressure. Along therewith, this water lowers the temperature of the combustion gas to a level below 1000° C.

The gaseous fluid mixture of high temperature and high pressure (i.e. high energy) of the combustion gas and the steam, which gaseous fluid has been produced in said container, is jetted out as a high energy gaseous fluid having such temperature and pressure as are suitable for use as the motive power of a heat engine via a pressure control valve which is provided locally on said closed, pressure-tight container. The aforesaid water has been de-aired prior to use, and accordingly no nitrogen oxide $NO_x$ is produced in the steam. Moreover, no nitrogen oxide $NO_x$ is present in the combustion gas. As the result, said high energy gaseous fluid does not contain any nitrogen oxide $NO_x$.

One of the advantages of the method for producing high temperature, high pressure and high energy gaseous fluid according to the present invention is found in the elimination of the production of $NO_x$ which, as in the conventional steam boiler or gas turbine system which performs open combustion in the atmosphere, is caused by the presence of nitrogen occupying about 80% of air. The second advantage lies in that, by the adoption of the oxygen/fuel complete combustion system, there can be obtained a high temperature jet flame over 2000° C as in the case of an oxygen acetylene burner for welding. In this system, it is impossible to introduce the high temperature jet flame directly into a heat engine because of the excessive high temperature of the flame. In the present invention, the jet flame does not hit the wall of a water-carrying pipe at its side. On the contrary, an arrangement is provided, as will be described later so that this high temperature jet flame acts so as to convert the water which is forced into the closed, pressure-tight container to a high pressurized steam. At the same time therewith, the temperature of the combustion gas is lowered to a lower level, for example, 1000° C. Thus, this combustion gas can be readily used as the motive power source of a heat engine which is connected to the downstream side of the apparatus of the present invention. Thirdly, water is converted to steam not through such a means as a boiler but by a substantially direct heating. Therefore, there is obtained an extremely great thermal efficiency, and accordingly the unit cost of the high temperature, high pressure steam which serves as the motive power source can be markedly reduced.

The apparatus for producing high energy gaseous fluid according to the present invention comprises a closed, pressure-tight container which concurrently serves as a combustion chamber and a steam producing chamber. A burner is provided locally on this container, preferably at the lower end portion thereof. This burner is intended to jet into the container both a fuel of a fluid-type or a fine powder-type and pure oxygen. This burner may have a structure similar to that of the known oxygen-acetylene burner intended for welding. An ignition plug is provided in the vicinity of this burner. The fuel which is introduced into said closed, pressure-tight container together with pure oxygen from said burner is ignited by the ignition plug and is combusted substantially perfectly, to provide a jet flame having a temperature of about 2000° C or above.

Means for forcing air-free water into the closed, pressure-tight container is provided locally on this container, preferably a portion near the upper end of the container. The water supplied into the container performs a substantially direct heat exchange with the heat from the jet flame. Thus, the water is instantaneously converted to a high temperature, high pressure steam. During this part of the operation, the combustion gas of the jet flame is cooled to a temperature, for example, lower than 1000° C. A pressure control valve which is designed to open when the internal pressure of the closed, pressure-tight container rises above a predetermined value is provided locally on the container, preferably at the upper end thereof. The mixed gaseous fluid of the combustion gas of the fuel, and the steam, is jetted out as a high temperature, high pressure and high energy gaseous fluid from said pressure control valve, to be utilized as a motive power source.

According to the present invention, there is provided, preferably inside said closed, pressure-tight container, a heat-resistant, efficiently heat-conductive hollow tubular member extending from said burner up to said pressure control valve. On the outer circumference of this hollow tubular member there is provided a spiral blade member. The water which substantially does not contain air and which has been introduced into the container by said water-introducing means flows downwardly along the spiral blade member. The high temperature jet flame which is produced from the burner and the very hot combustion gas thereof travel upwardly through the hollow portion of said tubular member. During this travel, the combustion gas conducts heat-exchange with the water which flows downwardly along the spiral blade member and is thus cooled to an appropriate temperature. Along therewith, this water is vaporized into steam of high temperature and high pressure. The aforesaid heat exchange is carried out indirectly via said hollow tubular member. In view of the fact that the combustion gas and the produced steam both are present jointly within the same closed, pressure-tight container, this heat exchange may be regarded substantially as a direct heat exchange. In other words, an outstanding feature of the present invention lies in the perfect combustion of the fuel and the production of steam due to the heat from this combustion, both of which are carried out within the same space. Thus, a substantially direct heat-exchange can be attained. It should be understood, however, that, instead of the provision of said hollow tubular member, an arrangement may be provided so that the water is introduced into the closed, pressure-tight container in atomized form. The atomized water is instantaneously vaporized by the great heat of the jet flame into a high temperature, high pressure steam.

An embodiment of the present invention will hereunder be described by referring to the accompanying drawing. The drawing shows the mechanism for performing complete combustion of a liquidous hydrocarbon fuel of petroleum origin in a pure oxygen stream within a closed, pressure-tight combustion chamber which is insulated from ambient air, and for converting water which is introduced into said combustion chamber separately from said fuel to a high pressure steam by the heat from said combustion, and for utilizing the mixed gaseous fluid consisting of the produced high pressure steam and the combustion gas (whose main components are steam and carbon dioxide) for driving a turbine.

In the drawing, reference numeral 1 represents a closed-type container which concurrently serves as a combustion chamber and a high pressure steam producing tower (hereinafter to be referred to simply as a steam producing tower). This steam producing tower 1 has, at its lower end portion, a burner 9 for combusting the fuel. This burner 9 is designed so as to perfectly combust the pressure-injected fuel with the oxygen which is simultaneously injected into this tower. This burner may have a structure which is substantially the same as that of the known oxygen-acetylene burner intended for welding.

The fuel introducing system comprises a fuel forcing-in pipe 2, a fuel jet forcing pump 3 communicating with said pipe 2, a fuel adjustment valve 4 operatively communicated with said pump 3, a pressure sensor 5 for fuel control and a computer 6. The sensor 5 and the computer 6 are operatively connected to the valve 4 and to the interior of the tower 1. The fuel which is supplied from a fuel tank (not shown) passes through a fuel flow pipe 7, and via the fuel adjustment valve 4, is jetted into the steam-producing tower 1 through a fuel jetting nozzle 8 which opens into this tower 1, as the fuel is let from the fuel forcing-in pipe 2 by the fuel jet forcing pump 3. This fuel which has thus been introduced into the tower 1 is then mixed with pure oxygen which is forced into the tower 1 from around the nozzle 8. The resulting mixture is ignited by an ignition plug 15 and is combusted to provide an elongated jet flame having a high temperature of about 2000° C or thereabove. This flame extends upwardly within the tower 1. The amount of the fuel to be forced into the tower 1 is adjusted by the fuel adjustment valve 4 which is actuated in accordance with a signal from the computer 6 which has been programmed in advance with the amount of fuel necessary for producing the required high pressure steam, said program being given interlockingly with the pressure sensor 5 assigned for detecting the pressure inside the tower and for keeping the internal pressure of the container at a given level. The adjusted amount of fuel is injected under pressure through the fuel jetting nozzle 8 which is similar in type as that of a diesel engine, by the fuel forcing-in pump 3. This fuel forcing pump 3 may be a known plunger-type pump. However, a fuel forcing-in pump designed for a diesel engine, which is one selected from a variety of standards presently placed on the market, may be used. Thus, the pump need not have any special structure.

The oxygen forcing-in system comprises an oxygen forcing-in pipe 10, an oxygen control valve 11 communicating with said pipe 10, a pressure sensor 12 for controlling the amount of oxygen to be supplied, and a computer 13. These latter members 12 and 13 are operatively connected to said valve 11 and the interior of the tower 1. The pressure sensor 12 may be one which is common in function to the aforesaid pressure sensor 5. Pure oxygen supplied from a high pressure oxygen container or a liquid oxygen tank (not shown) with or without the intervention of a pump not shown is discharged into the steam-producing tower 1 through an oxygen jetting nozzle 14 which opens into said tower 1, by the action of the oxygen control valve 11 which, in turn, opens and closes by the command from the oxygen control computer 13 which has been programmed in advance with the amount of oxygen necessary for carrying out perfect combustion of the fuel and which is actuated interlockingly with the pressure indicated by the pressure sensor 12, in the same way as that for the fuel supply system. This pure oxygen thus discharged is then mixed with the fuel which is jetted out from the fuel nozzle 8. The resulting mixture is ignited to produced said high temperature jet flame which burns as an enlongated bluish flame having a temperature as high as about 2000° C as described previously. Said burner has a dual concentric structure which is not any different from a known oxygen-acetylene burner for welding as stated previously.

The ignition device 15 may be one designed so as to pass an electric current through a platinum wire or a nichrome wire. However, by the use of an ignition plug for an automobile, it will be convenient from the viewpoints of low cost and of being easily attachable by means of screws. The fuel as well as oxygen are jetted into the tower under high pressure. Therefore, a jet flame of a bluish color which indicates perfect combustion is formed. It is noted clearly that the temperature of the flame immediately rises to a temperature as high as 2000° C or thereabove after the mixed gas jetted out from the nozzle burns. During this part of operation, the fuel is pulsatingly supplied by the fuel jetting pump 3 for a multi-cylindered diesel engine (it is shown in the form of four cylinders in the drawing). The fuel which is ejected from said pump 3 is collected into the fuel forcing-in pipe 2. Accordingly, the fuel is jetted constantly successively from the fuel jetting nozzle 8. Once the fuel is ignited, the combustion is carried out continuously and automatically.

On the other hand, substantially de-aired water is caused to flow by a water forcing-in system from an upper portion of the high temperature, high pressure steam producing tower 1 onto the upper end of a spiral plate deck 18 intended for producing steam, which is provided in this tower 1. This water forcing-in system comprises a water forcing-in pipe 16 which opens at one end within the tower 1 to face the upper end of said spiral deck 18 provided in the tower 1; a water injecting pump 17 connected to the other end of said pipe 16 and at its suction side to a water supply source for forcing water into the tower 1 at a pressure coping with the high pressure within this tower 1, and a water supply amount control means connected between the tower 1 and the water pump 17 and including a sensor 27 for dectecting the internal pressure of the tower 1 and a computer 28 for receiving the detection output signal from the sensor 27 and dispatching a command to the water pump 17, to thereby supply a controlled amount of air-free water into the tower 1 under a pressure coping with the internal pressure of the container. This water injecting pump 17 may be one identical in type with such fuel pump designed for a diesel engine as that used in the aforesaid fuel forcing-in system. This water pump 17, however, is required to be of a type that can force water into the tower without mixing the water with air.

Said spiral blade member or the spiral deck 18 is made of a material having a good heat conductivity and yet heat-resistance and is secured, by for example welding, to the outer circumferential wall of a tubular member 19 to extend longitudinally around this circumferential wall. The tubular member 19 has an inner diameter corresponding to the size (for example a diameter of 50 ~ 100mm) of said jet flame extending from the burner 9, so that said inner diameter of the tubular member 19 may then be, for example, 10mm. Said tubular member 19 is designed and positioned so that the wall surface of the tubular member 19 is not directly hit by the central high temperature portion of about 2000° C of the jet flame which vertically ascends through the hollow portion of the tube 19. In this example, this tubular member 19 is positioned to extend vertically within the tower 1 on substantially the central longitudinal axis of the tower 1 so that its lower open end faces the nozzles 8 and 14 of the dual nozzle burner 9. This tubular member 19 serves to guide the upward travel of the flame and the combustion gas. The upper open end of the tubular member faces a pressure control valve 21 which will be described later. This tubular member 19 is made with a material which has a good heat conduction and yet is heat-resistant. By so doing, the tubular member 19 as well as the spiral deck 18 have no chance of being melted or destroyed even where they are made of a stainless steel.

The water which is not mixed with air and which is introduced into the steam-producing tower 1 from said water forcing-in pipe 16 flows downwardly in a thin stream on the spiral deck 18 which serves as the guiding means of this water stream. The high temperature combustion gas of the high temperature jet flame which ascends through the tubular member 19 made of stainless steel almost instantaneously vaporize the above-said flowing water into steam of high temperature and high pressure due to the effect of the closed chamber.

A high pressure gas jetting tube 20 provided with the pressure control valve 21 for high energy gaseous fluid is secured to the upper end of the high temperature, high pressure steam producing tower 1, which concurrently serves as the combustion chamber, facing the upper open end of the tubular member 19. As the pressure of the mixture of the steam and the combustion gas within the tower 1 progressively rises after the ignition of the burner, and when, thus, the pressure of this high pressure/energy gaseous fluid arrives at such a level sufficient for driving a heat engine such as a gas turbine system, the aforesaid pressure control valve 21 automatically opens to jet out the high pressure gaseous fluid through the jet pipe 20 to drive a turbine 23 which is housed within a turbine chamber 22. The resulting exhaust gas of the high temperature, high pressure gaseous fluid after having accomplished and finished its role of driving the turbine and which now has become low in both temperature and pressure is let to a condensation tower 25 from the bottom of the exhaust chamber. This exhaust gas at such a time is a white smoke-like steam still having a temperature of about 100° C as seen in a steam engine. This steam is condensed within a meandering condenser 26 housed in the condensation tower 25. From the bottom of this condenser 26, the resulting water is discharged into the cooling water provided within the condensation tower 25. A part of the combustion gas (carbon dioxide) which has not been liquefied yet by the condenser 26 is discharged into the cooling water first and then it is allowed to escape in all directions from the surface of the cooling water. It should be noted that substantially no $NO_x$ is contained in said unliquefied combustion gas. In the present embodiment shown, a part of the cooling water contained within the condensation tower 25 is supplied to the water injecting pump 17 to be utilized as the forcing-in water. Basically speaking, this forcing-in water may be arranged so that it is supplied from a separate water tank to the injecting pump 17.

Regarding the fuel, it is not limited to liquid fuel of petroleum origin, but various types of fuel such as gaseous-liquidous and solid fuels which are available in the market may be used. However, the fundamental point of the present invention lies in that oxygen is contained in the air and which is being used in known types of combustion systems is not used for carrying out combustion; but that a fuel is combusted substantially perfectly in a pure oxygen stream in a closed, pressure-tight container insulated from ambient atmosphere so that substantially no nitrogen oxides nor carbon monoxide are contained in the combustion gas; that substantially direct heat exchange between this combustion gas and water is carried out in said closed, pressure-tight container which serves as the combustion chamber, to produce high temperature, high pressure steam; that the gaseous fluid mixture of this steam and the combustion gas is jetted out as a high energy gaseous fluid which can be used as the actuator fluid for heat engines. Accordingly, the fuel which can be used in the apparatus and the method of the present invention, preferably, is one which does not contain nitrogen compounds. For example, gaseous fuels such as natural gas and hydrogen, liquid hydrocarbon fuels such as heavy oil, light oil and gasoline, and synthetic fuels such as benzol and alcohol are convenient from the view point of handling. Also, solid fuels such as coal, charcoal and woods, if pulverized into fine powder, can be combusted perfectly in an oxygen stream in the same way as in the case of liquid fuels. Thus, these solid fuels are included as the fuel source of the present invention. It should be understood that, the aforesaid fuels are such that nitrogen which is contained in air could be present or mingled therein depending on the place of production or during the course of refining. However, the amount of such nitrogen is only trifle (less than 1%) when compared with the nitrogen content of air. Also, it is easy to remove such a trifling amount of nitrogen even when a small amount of nitrogen compounds is present in a fuel and even when, accordingly, a further small amount of $NO_x$ is produced. Such $NO_x$ can be reduced to a negligible amount by arranging it so that the $NO_x$ are washed with water in the condensation chamber as in the instant embodiment and then they are discharged into the air. In case of use of fine powder such as charcoal or coal, on the other hand, there will arise the problem of the production of ashes. However, in the present invention, the temperature inside the steam-producing tower is as high as 500° C or thereabove. Therefore, the ashes are let into the cooling tower in the form of smoke so that they are collected in water in the form of sludge which is allowed to stay at the bottom of this tower. Thus, it is easily removed therefrom.

We claim:

1. A method for producing high temperature, high pressure and high energy gaseous fluid for use as the actuator fluid in a heat engine, comprising the steps of:

providing a closed pressure-tight container which defines therein a closed space insulated from ambient temperature, said space including inlet and discharge zones adjacent the opposite ends of said chamber, and a hollow tubular guide positioned within said space in spaced relationship from the walls of said chamber and extending between the inlet and discharge zones;

introducing a nongaseous flowable hydrocarbon fuel and pure oxygen into said inlet zone and combusting them together to form a flame and resulting in a high temperature combustion gas which is formed substantially of steam and carbon dioxide;

directing the high temperature combustion gas from the inlet zone through the tubular guide toward the discharge zone so that the high temperature combustion gas is confined to flow substantially solely within the tubular guide as it flows from the inlet zone to the discharge zone;

introducing substantially air-free water into said chamber at a location which is positioned externally of said tubular guide and spaced a substantial distance from said inlet zone;

causing the water introduced at said location to flow generally toward said inlet zone while maintaining said water separated from the combustion gas which is flowing away from said inlet zone due to said tubular guide being positioned therebetween;

effecting heat transfer from the combustion gas flowing within said tubular guide through said tubular guide to the water which is flowing exteriorly thereof to cause generation of steam within said closed space in surrounding relationship to said tubular guide;

mixing the combustion gas and the steam to form a high temperature, high pressure mixed gaseous fluid at said discharge zone; and discharging the high temperature, high pressure gaseous fluid from said discharge zone through a pressure-controlled valve to permit utilization of this gaseous fluid as the motive power energy source of a heat engine.

2. A method according to claim 1, including the steps of jetting the oxygen and fuel into the inlet zone in substantial coaxial alignment with said tubular guide; and igniting the mixture of the fuel and oxygen jetted into said inlet zone to form an elongated flame which projects into said tubular guide.

3. A method according to claim 2, including the steps of introducing said water into the space at a location disposed closely adjacent said discharge zone, and directing the flow of said water coaxially of said guide tube in a direction toward said inlet zone with said flow being confined exteriorly of and in surrounding relationship to said guide tube.

4. A method according to claim 3, wherein the discharge zone is spaced vertically upwardly from said inlet zone so that the combustion gas flows axially upwardly through the tubular guide while the water which is supplied into said space flows axially downwardly exteriorly of said tubular guide.

5. An apparatus for producing a high temperature, high pressure and high energy gaseous fluid for use as the actuator fluid of a heat engine, comprising:

a closed pressure-tight container defining therein a closed space which is insulated from ambient atmosphere, said container defining inlet and discharge zones within said space adjacent the opposite ends of said container;

an elongated tubular guide means positioned within said container and extending longitudinally thereof, said tubular guide means having the opposite ends thereof communicating with said inlet and discharge zones, said tubular guide means being spaced inwardly from said container so that said closed space includes an annular portion disposed exteriorly of and surrounding said tubular guide means;

means for supplying a flowable fuel and pure oxygen into said inlet zone at a controlled rate;

means for igniting the fuel supplied into said inlet zone to carry out substantially complete combustion of said fuel with said pure oxygen to form a combustion flame which is directed axially into said tubular guide means and which thereby produces a high temperature combustion gas which flows axially through said tubular guide means toward said discharge zone;

means for supplying substantially air-free water into the annular portion of said space and for causing the water to come into direct external contact with said guide means, whereby said water is converted into steam due to the heat transferred from said combustion gas through said guide means;

the discharge zone of said space being in open communication with the discharge end of said tubular guide means and said annular portion to permit mixing of said combustion gas and said steam to produce a high temperature, high pressure and high energy gaseous fluid; and means for permitting discharge of the gaseous fluid from said discharge zone so that said gaseous fluid can be supplied to a heat engine for use as the actuator fluid thereof.

6. An apparatus according to claim 5, wherein the means for supplying fuel and oxygen to said inlet zone includes nozzle means for injecting said fuel and oxygen into said inlet zone in substantially coaxial alignment with said tubular guide means.

7. An apparatus according to claim 6, wherein said tubular guide means has the inlet end thereof spaced axially from said nozzle means, and said inlet end of said tubular guide means being flared outwardly to positively guide the flame and the combustion gas into said tubular guide means.

8. An apparatus according to claim 6, wherein said tubular guide means has a spiral guide member fixed externally thereof and extending axially therealong, and wherein said means for supplying water into the annular portion of said space includes pipe means for discharging the water onto the spiral member at a location disposed more closely adjacent the discharge zone.

9. An apparatus according to claim 5, wherein said means for supplying water into said space includes pipe means for discharging water into the annular portion of said space at a location which is positioned more closely adjacent the discharge zone, and water-stream guiding means associated with and positioned externally of said tubular guide means for causing the water supplied into said space at said location to flow axially of said tubular guide means toward said inlet zone.

10. An apparatus according to claim 9, wherein said water-stream guiding means comprises an elongated spiral member which is externally fixed to and extends axially along the length of said tubular guide means.

11. An apparatus according to claim 10, wherein the opposite ends of said tubular guide means terminate short of the walls of said container.

12. An apparatus according to claim 5, wherein said container comprises an upright elongated cylindrical shell having the inlet and discharge zones respectively defined at the lower and upper ends thereof, and wherein said tubular guide means is positioned interiorly of said shell and extends vertically in substantial coaxial alignment with the longitudinally extending axis of said shell.

13. An apparatus according to claim 12, wherein the means for injecting said fuel and oxygen into said inlet zone comprises nozzle means which communicate with the lower end of said shell in substantial coaxial alignment with said tubular guide means, and said igniting means being positioned adjacent the discharge of said nozzle means for causing a combustion flame which projects axially upwardly from said nozzle means directly into said tubular guide means.

14. An apparatus according to claim 13, wherein said discharge means includes a discharge opening formed at the upper end of said shell in substantial coaxial alignment with said tubular guide means, and wherein said means for supplying water into said space includes pipe means communicating with said space adjacent the upper end of said shell for supplying water into said space at a location which is positioned externally of said tubular guide means but adjacent the upper end thereof.

15. An apparatus according to claim 14, wherein the pipe means discharges the water so that same flows axially downwardly along the tubular guide means in external surrounding relationship thereto.

16. An apparatus for producing a high temperature, high pressure and high energy gaseous fluid, consisting essentially of:

a closed, upright, elongated, generally cylindrical, pressure vessel;

a combustion burner extending vertically through the lower end of said vessel and substantially coaxial therewith, means for supplying a flowable fuel to said burner and means for supplying pure oxygen to said burner whereby to burn said fuel to form an elongated jet flame directed substantially vertically upwardly along the longitudinal axis of said vessel toward the upper end thereof;

an outlet conduit extending from the upper end of said vessel substantially coaxial with said burner and a pressure-responsive control valve in said outlet conduit for discharging high energy gaseous fluid from said vessel when the pressure thereof exceeds a preselected value;

an elongated straight tube which is open at its opposite ends and which has a closed side wall, said tube being disposed within said vessel and being substantially coaxial with said burner and said outlet conduit, said tube extending from a location located close to but vertically spaced upwardly from said burner to a location located close to but spaced vertically downwardly from said outlet conduit, said tube being effective to confine said jet flame emanating from said burner and to direct it upwardly toward said outlet conduit;

a continuous, helical flight welded along its inner edge to the exterior surface of said tube and extending along said tube from a position adjacent the upper end thereof to a position adjacent the lower end thereof, the radially outer edge of said flight being radially spaced from the interior wall of said vessel to define an open zone therebetween, and means for supplying substantially air-free water onto the upper surface of said flight at the upper end thereof whereby said water flows downwardly along said flight and is transformed into steam by heat transfer from said jet flame and simultaneously the temperature of said jet flame is reduced as it rises in said tube so that said steam and the combustion gases from said jet flame form said high energy gaseous fluid.

* * * * *